(12) United States Patent
Layne

(10) Patent No.: US 10,907,740 B2
(45) Date of Patent: Feb. 2, 2021

(54) CONTROL VALVE HAVING A METAL SLEEVE WITHIN A PLASTIC VALVE BODY

(71) Applicant: HUSCO Automotive Holding LLC, Waukesha, WI (US)

(72) Inventor: Michael Layne, Waterford, WI (US)

(73) Assignee: HUSCO Automotive Holdings LLC, Waukesha, WI (US)

( * ) Notice: Subject to any disclaimer, the term of this patent is extended or adjusted under 35 U.S.C. 154(b) by 0 days.

(21) Appl. No.: 15/377,334

(22) Filed: Dec. 13, 2016

(65) Prior Publication Data

US 2017/0167617 A1 Jun. 15, 2017

Related U.S. Application Data

(60) Provisional application No. 62/267,575, filed on Dec. 15, 2015.

(51) Int. Cl.
| | | |
|---|---|---|
| *F16K 11/07* | (2006.01) | |
| *F16K 31/06* | (2006.01) | |
| *F16K 27/04* | (2006.01) | |
| *B23P 15/00* | (2006.01) | |

(52) U.S. Cl.
CPC ............ *F16K 11/07* (2013.01); *B23P 15/001* (2013.01); *F16K 27/041* (2013.01); *F16K 27/048* (2013.01); *F16K 31/0613* (2013.01)

(58) Field of Classification Search
CPC ...... F16K 11/07; F16K 27/048; F16K 27/041; F16K 27/04; F16K 31/0613; F16K 31/06; F16K 3/314; F16K 3/30; F16K 3/24; B23P 15/001; F25B 41/06; Y10T 137/6007
See application file for complete search history.

(56) References Cited

U.S. PATENT DOCUMENTS

| | | | | |
|---|---|---|---|---|
| 3,324,885 | A * | 6/1967 | Beech | F15B 13/04 |
| | | | | 137/624.18 |
| 4,988,077 | A | 1/1991 | Conley et al. | |
| 5,100,103 | A | 3/1992 | Conley et al. | |
| 5,897,098 | A | 4/1999 | Nishinosono et al. | |
| 5,911,400 | A * | 6/1999 | Niethammer | F16K 27/041 |
| | | | | 251/129.08 |
| 6,527,010 | B1 * | 3/2003 | Watson | E21B 34/04 |
| | | | | 137/625.63 |
| 7,886,760 | B2 * | 2/2011 | Groschel | F16K 31/06 |
| | | | | 137/315.03 |

(Continued)

FOREIGN PATENT DOCUMENTS

| | | |
|---|---|---|
| CN | 101140039 A | 3/2008 |
| CN | 201311305 Y | 9/2009 |

(Continued)

OTHER PUBLICATIONS

Extended European Search Report; 16204176.8-1751; dated Apr. 24, 2017; 7 pages.

*Primary Examiner* — Umashankar Venkatesan
*Assistant Examiner* — Andrew J Rost
(74) *Attorney, Agent, or Firm* — Quarles & Brady LLP

(57) ABSTRACT

A control valve that includes a valve body, a spool, and an actuator is provided. The valve body includes a plastic body housing and a metallic sleeve housed within the body housing. The spool is received within the metallic sleeve and is movable between a first position and a second position. The actuator is coupled to the valve body and to the spool.

15 Claims, 6 Drawing Sheets

(56) References Cited

U.S. PATENT DOCUMENTS

| | | | |
|---|---|---|---|
| 8,070,129 B2* | 12/2011 | Makino | F16K 27/041 251/129.15 |
| 8,684,038 B2* | 4/2014 | Schudt | F16K 31/0613 137/625.68 |
| 8,757,209 B2* | 6/2014 | Morgan | F16K 3/262 137/625.68 |
| 2004/0113112 A1 | 1/2004 | Hirata et al. | |
| 2005/0279957 A1* | 12/2005 | Inami | F16K 27/041 251/129.15 |
| 2015/0144820 A1 | 4/2015 | Mills et al. | |

FOREIGN PATENT DOCUMENTS

| | | |
|---|---|---|
| CN | 202220895 U | 5/2015 |
| DE | 102013221218 A1 | 4/2015 |
| EP | 0023133 B1 | 8/1983 |
| WO | 2012015679 A2 | 2/2012 |

\* cited by examiner

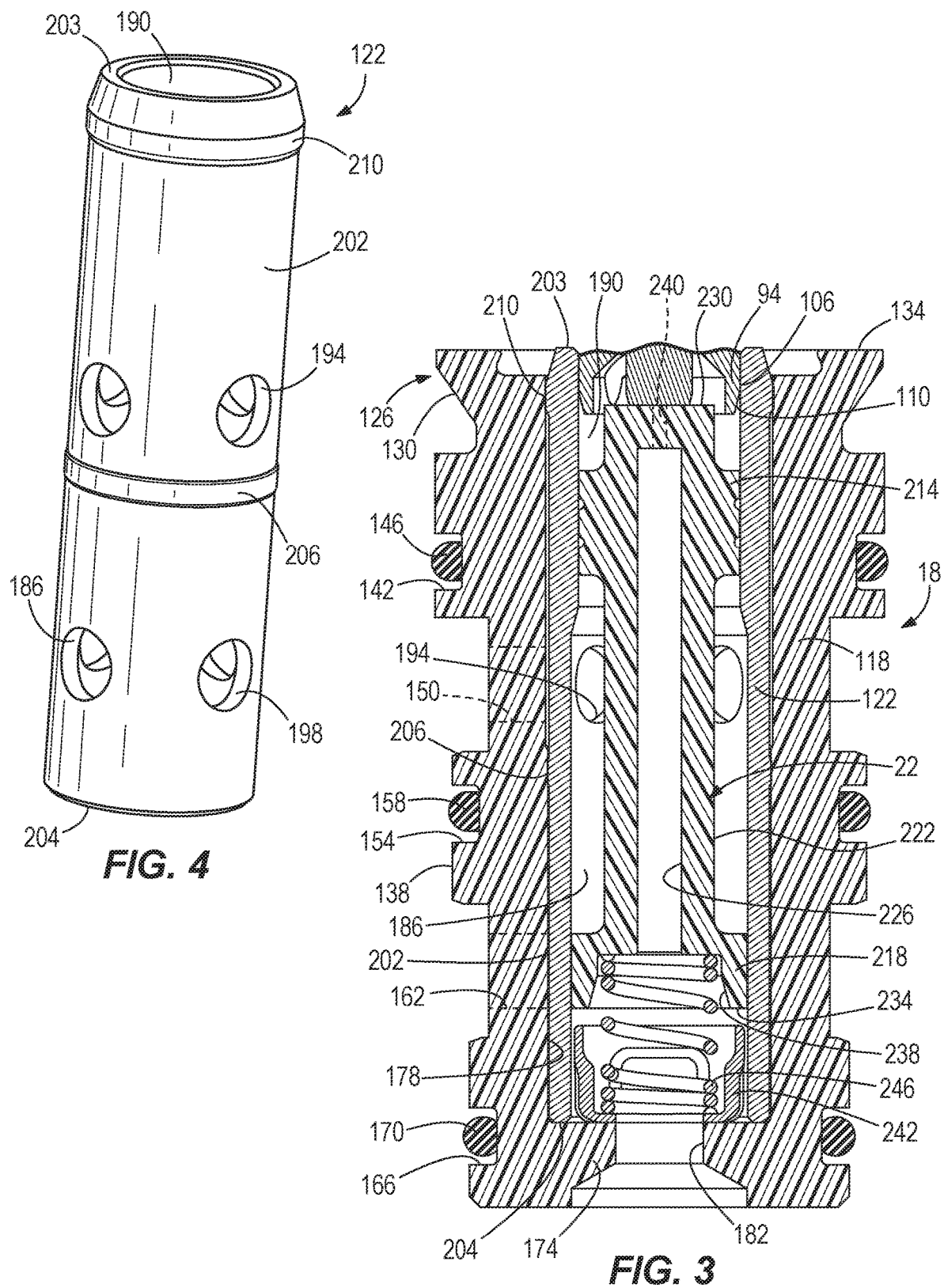

CONTROL VALVE HAVING A METAL SLEEVE WITHIN A PLASTIC VALVE BODY

CROSS-REFERENCES TO RELATED APPLICATIONS

The present application is based on, claims priority to, and incorporates herein by reference in its entirety, U.S. Provisional Patent Application No. 62/267,575, filed on Dec. 15, 2015, and entitled "Metal Sleeve Within A Plastic Valve Body."

STATEMENT REGARDING FEDERALLY SPONSORED RESEARCH

Not Applicable.

BACKGROUND

The present invention relates to control valves. More particularly, the invention relates to hydraulic control valves having a metal sleeve within a plastic valve body.

It can be known in the art relating to control valves, that valve bodies are typically machined from metal bar stock, block, or cast metal such as an aluminum block or a cast aluminum part. Control valves typically include geometry machined on the outer surfaces of the valve bodies that can be arranged to couple the control valve into the related system (e.g., a variable displacement oil pump or cam phasing system).

It would be desirable to provide a control valve body with the complicated geometry needed for mating the control valve with the related system at a lower cost and production time while providing a high quality valve.

SUMMARY OF THE INVENTION

In one aspect, the present invention provides a control valve includes a valve body, a spool, and an actuator. The valve body includes a plastic body housing and a metallic sleeve housed within the body housing. The spool is received within the metallic sleeve and is movable between a first position and a second position. The actuator is coupled to the valve body and to the spool.

In another aspect, the present invention provides a valve body for a control valve. The control valve includes an actuator that is configured to move a spool within the valve body, and a coupler arranged between the actuator and the valve body. The valve body includes a plastic body housing and a substantially cylindrical metallic sleeve. The plastic body housing defines an inner bore, a first housing port, and a second housing port. The substantially cylindrical metallic sleeve is press fit into the inner bore and is configured to receive the spool. The metallic sleeve defines a first sleeve port in fluid communication with the first housing port, and a second sleeve port in fluid communication with the second housing port.

In another aspect, the present invention provides a method of manufacturing a control valve. The control valve includes a valve body having a plastic body housing that defines an inner bore and a metallic sleeve that defines an annular projection, a spool, a coupler that includes a sleeve projection, and an actuator. The method includes press fitting the sleeve into the body housing such that the annular projection seals against the inner bore, inserting the spool into the sleeve, inserting the sleeve projection into the sleeve, and coupling the actuator to the coupler and the valve body.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DESCRIPTION OF DRAWINGS

The invention will be better understood and features, aspects and advantages other than those set forth above will become apparent when consideration is given to the following detailed description thereof. Such detailed description makes reference to the following drawings

FIG. 3 is a detailed sectional view of the control valve of FIG. 1.

FIG. 4 is a pictorial view of a sleeve of the control valve of FIG. 1.

DETAILED DESCRIPTION OF THE INVENTION

Figure 1:
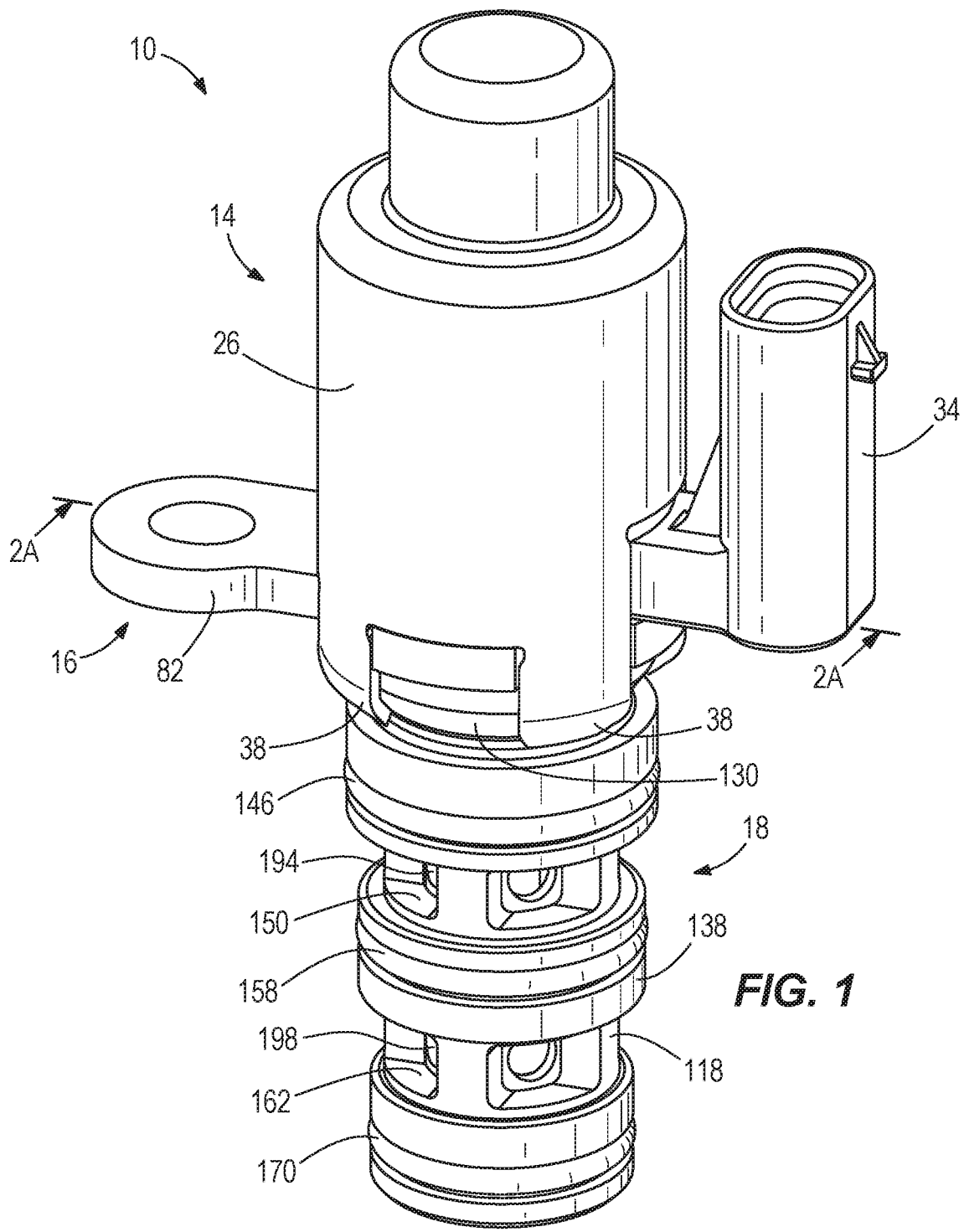
FIG. 1 is be a pictorial view of a control valve according to one aspect of the present invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 shows a control valve 10 that can include an actuator 14, a coupler 16, a valve body 18, and a spool 22 (see FIG. 2). In one embodiment, the control valve 10 can be a proportional variable displacement oil pump control valve. In other embodiments, the control valve 10 can be a cam phasing control valve or another type of control valve, as desired.

Figure 2A:
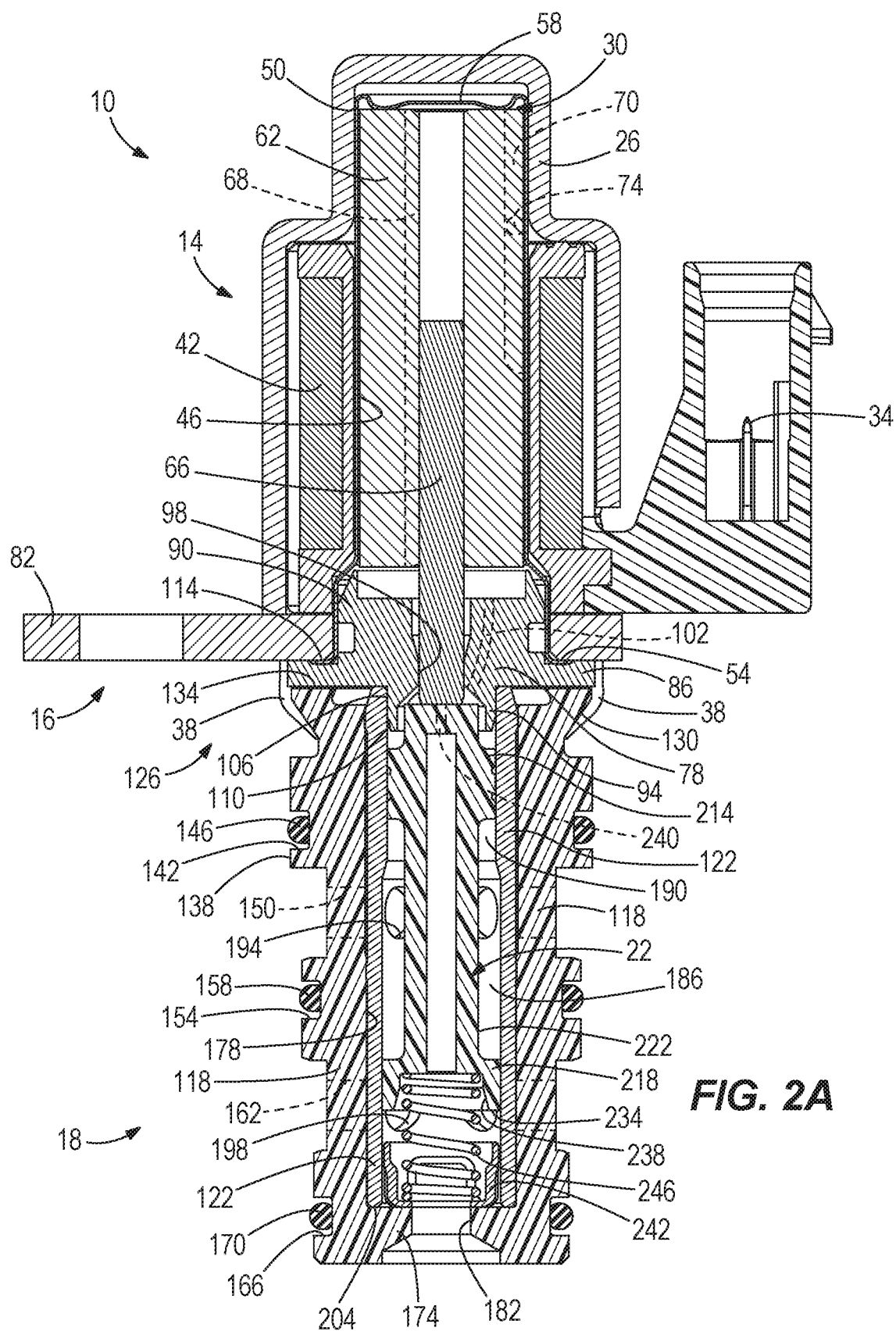
FIG. 2A is a cross-sectional view of the control valve of FIG. 1 taken along line 2A-2A of FIG. 1 with the control valve in a first arrangement.
Figure 2B:
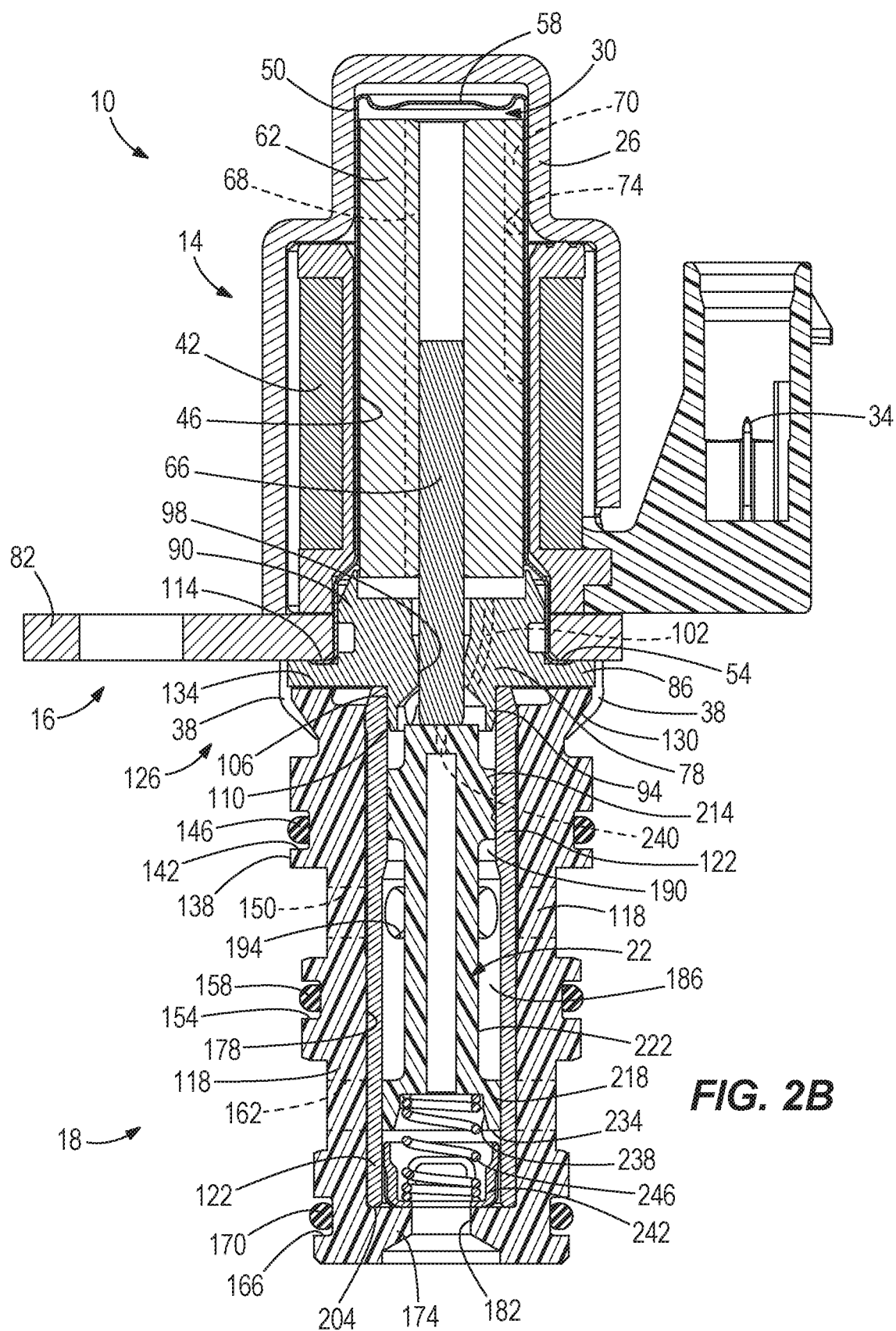
FIG. 2B is a cross-sectional view of the control valve of FIG. 1 taken along line 2A-2A of FIG. 1 with the control valve in a second arrangement.
Figure 2C:
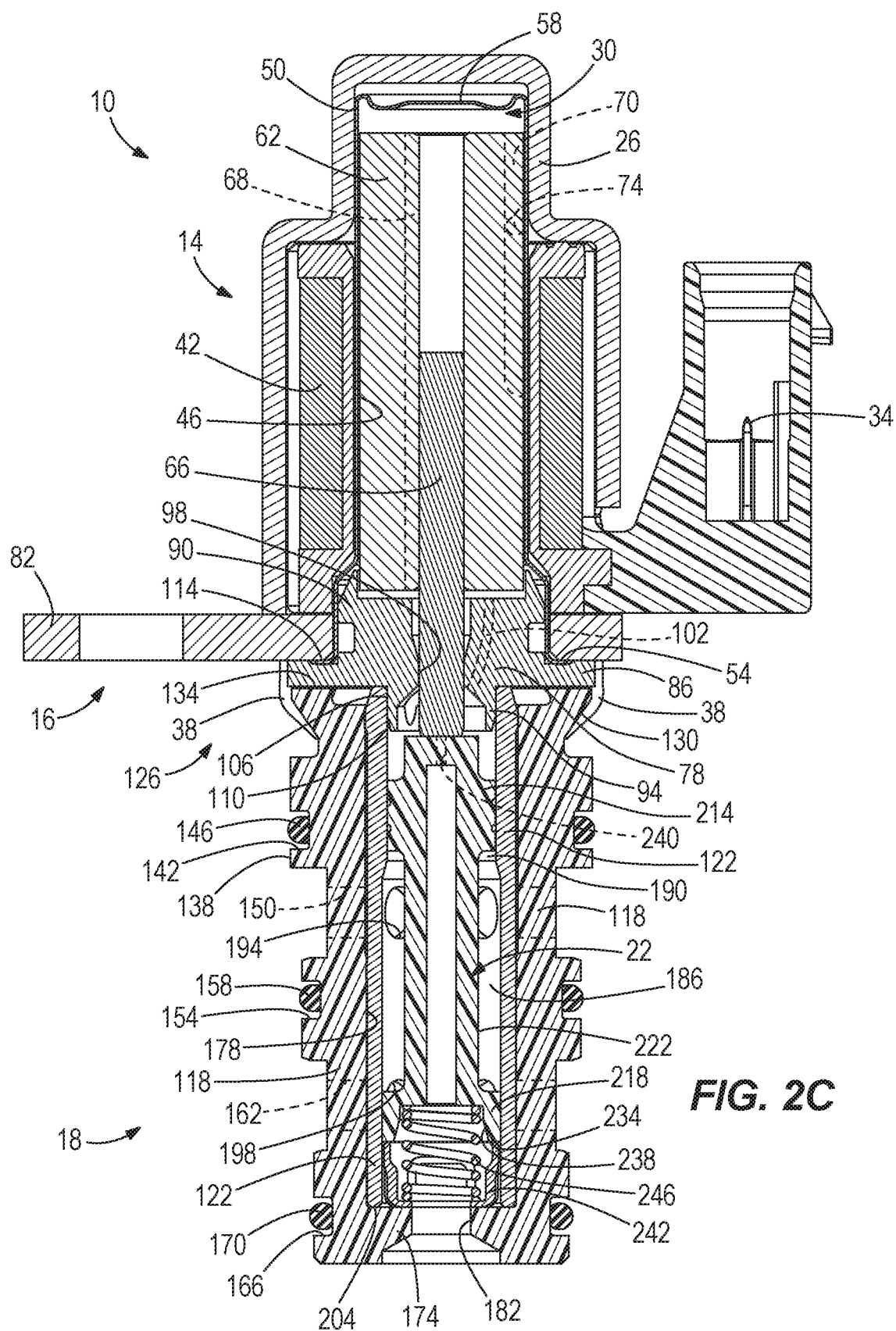
FIG. 2C is a sectional view of the control valve of FIG. 1 taken along line 2A-2A of FIG. 1 with the control valve in a third arrangement.

Turning to FIG. 2, the actuator 14 can be an electronic actuator such as a solenoid actuator and includes an actuator housing 26 defining a cavity 30, an electrical connection 34, and tabs 38. A winding 42 can be arranged within the cavity 30 and defines an inner bore 46 and can be electrically coupled to the electrical connection 34. A liner 50 can be received within the inner bore 46 and includes a flange 54 and a closed end 58. An armature in the form of a piston 62 can be sized to be received within the liner 50 and can be movable between a first position (see FIG. 2A), a second position (see FIG. 2B), and a third position (see FIG. 2C). The geometry of the closed end 58 can act as a stop for the piston 62 and can inhibit fluid film sticking effects often called joblocking. A rod 66 can be rigidly coupled to the piston 62 and extends therefrom. The piston 62 can define an aperture in the form of a channel 68 that extends through the piston 62 to provide fluid communication therethrough. The piston 62 can also include a bearing mechanism in the form of recesses 70 arranged radial about the piston 62 and ball bearings 74 arranged within the recesses 70. In the illustrated actuator 14, five bearing mechanisms can be spaced circumferentially about the piston 62 to provide smooth motion between the first position, the second position, and the third position. In other embodiments, more or less than five bearing mechanisms may be spaced circumferentially about the piston 62.

The coupler 16 can include a pole piece 78 and a mounting bracket 82. The pole piece 78 can define a coupling flange 86, a piston receiving portion 90 sized to receive the piston 62, a sleeve projection 94, a rod aperture 98 extending between the piston receiving portion 90 and the sleeve projection 94 and sized to receive the rod 66, and a vent 102 providing fluid communication between the piston receiving portion 90 and the sleeve projection 94. The sleeve projection 94 can extend from the coupling flange 86 and can define a substantially cylindrical side wall 106 and a tapered portion 110. The tapered portion 110 may define an outer tapered portion being arranged along an outer surface of the sleeve projection 94 at an axial end of the sleeve projection 94. The sleeve projection 94 may also define an inner recess within which the an end (e.g., at least a first end surface 230) of the spool 22 is at least partially received in one of the positions of the spool 22 (see, e.g., FIG. 2A). The inner recess may include an inner tapered portion being arranged along an inner surface of the sleeve projection 94, which is configured to receive the end of the spool 22 in one of the positions of the spool 22. The coupling flange 86 can define a recess 114 sized to receive the flange 54 of the liner 50. The mounting bracket 82 can be received about the pole piece 78 between the coupling flange 86 and the actuator housing 26 to hold the liner 50 in place.

Turning to FIG. 3, the valve body 18 can include a body housing 118 and a sleeve 122. The body housing 118 can be constructed of a plastic, for example by injection molding, and can define a mating portion 126 that can include a frustoconical surface 130 and a flange surface 134. The body housing 118 can also include mating geometry in the form of a substantially cylindrical outer surface 138, a pump seal recess 142 sized to receive a seal in the form of an o-ring 146, a plurality of pump ports 150, a control seal recess 154 sized to receive a seal in the form of an o-ring 158, a plurality of control ports 162, a valve seal recess 166 sized to receive a seal in the form of an o-ring 170, and a bottom wall 174. A substantially cylindrical inner bore 178 can extend from the flange surface 134 to the bottom wall 174, and a tank port 182 can provide fluid communication to the inner bore 178 through the bottom wall 174. The mating geometry of the body housing 118 can be constructed to mate with the desired system and provide desirable sealing connections. For example, in another embodiment, the control valve 10 can be arranged for use in a cam phasing system and can include appropriate porting and sealing locations to meet with such a system. In some embodiments, more than one or less than one of each of the pump ports 150 and the control ports 162 may be provided as desired. In other embodiments, the ports 150, 162, 182 may be constructed with threads or other mating features to allow direction connection of plumbing.

In an alternative embodiment, the mating geometry includes an outer surface 138 that may be constructed with tight tolerances and the seal recesses 142, 154, 166 and seals 146, 158, 170 are eliminated so that leakage is controlled by a small clearance between the system component bore and the outer surface 138. In a further alternative, the outer surface 138 may be constructed with tight tolerances and include the seal recesses 142, 154, 166 such that an end user has the option of controlling leakage with either the seals 146, 158, 170 or with the tight tolerance of the outer surface 138.

Turning to FIG. 4, the sleeve 122 can be constructed of aluminum with or without hard anodize, or other metals (e.g., a ferrous metal such as steel), and can define a smooth lower valve bore 186 defining a first diameter and a smooth upper valve bore 190 defining a second diameter that can be less than the first diameter. The sleeve 122 can include sleeve pump ports 194 arranged to align with the pump ports 150 of the body housing 118 and sleeve control ports 198 arranged to align with the control ports 162 of the body housing 118. The sleeve 122 can define a substantially cylindrical outer surface 202 that extends between a first end 203 and a second end 204. A first local light press fit area in the form of an annular projection 206 can be arranged between the sleeve control ports 198 and the sleeve pump ports 194. A second local light press fit area in the form of an annular projection 210 can be arranged between the pump ports 194 and the first end 203. The annular projections 206, 210 define a diameter that can be slightly larger than a diameter of the inner bore 178 of the body housing 118 such that a press fit can be formed and a seal can be provided by the interaction of each annular projection 206, 210 and the inner bore 178.

Referring back to FIG. 3, the spool 22 can be a sliding type spool and can include a first land 214 arranged to seal against the upper valve bore 190, a second land 218 arranged to selectively control flow through the sleeve control port 198, and a groove 222 between the first land 214 and the second land 218. The second land 218 can be sized such that the sealing area is smaller than the diameter of the control port 198. The relative size of the second land 218 and the control port 198 can allow the second land 218 to be arranged to provide small amounts of flow to both the pump port 194 and the tank port 182 simultaneously as will be discussed in more detail below. The spool 22 can also define an aperture 226 extending between a first end surface 230 and a second end surface 234, and a spring recess 238 can be formed in the second end surface 234. A vent 240 can be formed between the first land 214 and the first end surface 230.

Assembly of the control valve 10 will be described below with reference to FIG. 2A. To assembly the control valve 10, the sleeve 122 can be pressed into the inner bore 178 of the body housing 118 such that the annular projections 206, 210 of the sleeve 122 sealingly engage the inner bore 178. With the sleeve 122 pressed in place, the sleeve pump ports 194 of the sleeve 122 can be aligned with the pump ports 150 of the body housing 118 and the sleeve control ports 198 can be aligned with the control ports 162 of the body housing 118. The annular projections 206, 210 can provide a seal against the inner bore 178 and isolate the pump ports 150 from the control ports 162 and tank port 182 (via valve internal leak paths).

A biasing element retainer in the form of a spring cup 242 can be inserted into the inner bore 178 of the body housing 118 in abutment with the bottom wall 174. The spring cup 242 can be sized larger than the tank port 182. A biasing element in the form of a spring 246 can be engaged with the spring cup 242, and the spool 22 can be then inserted into the sleeve such that the second land 218 engages the smooth lower valve bore 186 and the first land 214 engages the smooth upper valve bore 190. The spring 246 can be received within the spring recess 238 of the spool 22 and can bias the spool away from the bottom wall 174 of the body housing 118.

The actuator 14 can then be attached to the coupler 16 with the flange 54 of the liner 50 positioned in the recess 114 and compressed between the coupler flange 86 and the mounting bracket 82 to fluidly isolate the piston 62 and the rod 66 from the winding 42. The assembled coupler 16 and actuator 14 can then be coupled to the assembled valve body 18.

The sleeve 122 can be aligned with the sleeve projection 94 of the pole piece 78 and engaged therewith. The tapered portion 110 can make centering and insertion simple and accurate and the cylindrical side wall 106 can support the sleeve 122 during operation. When the sleeve projection 94 can be fully inserted into the sleeve 122, the first end 203 of the sleeve 122 engages the coupling flange 86 and the second end 204 of the sleeve 122 engages the bottom wall 174 of the body housing 118 to seal the sleeve 122 against the coupler 16 and the body housing 118, respectively.

Figure 5:
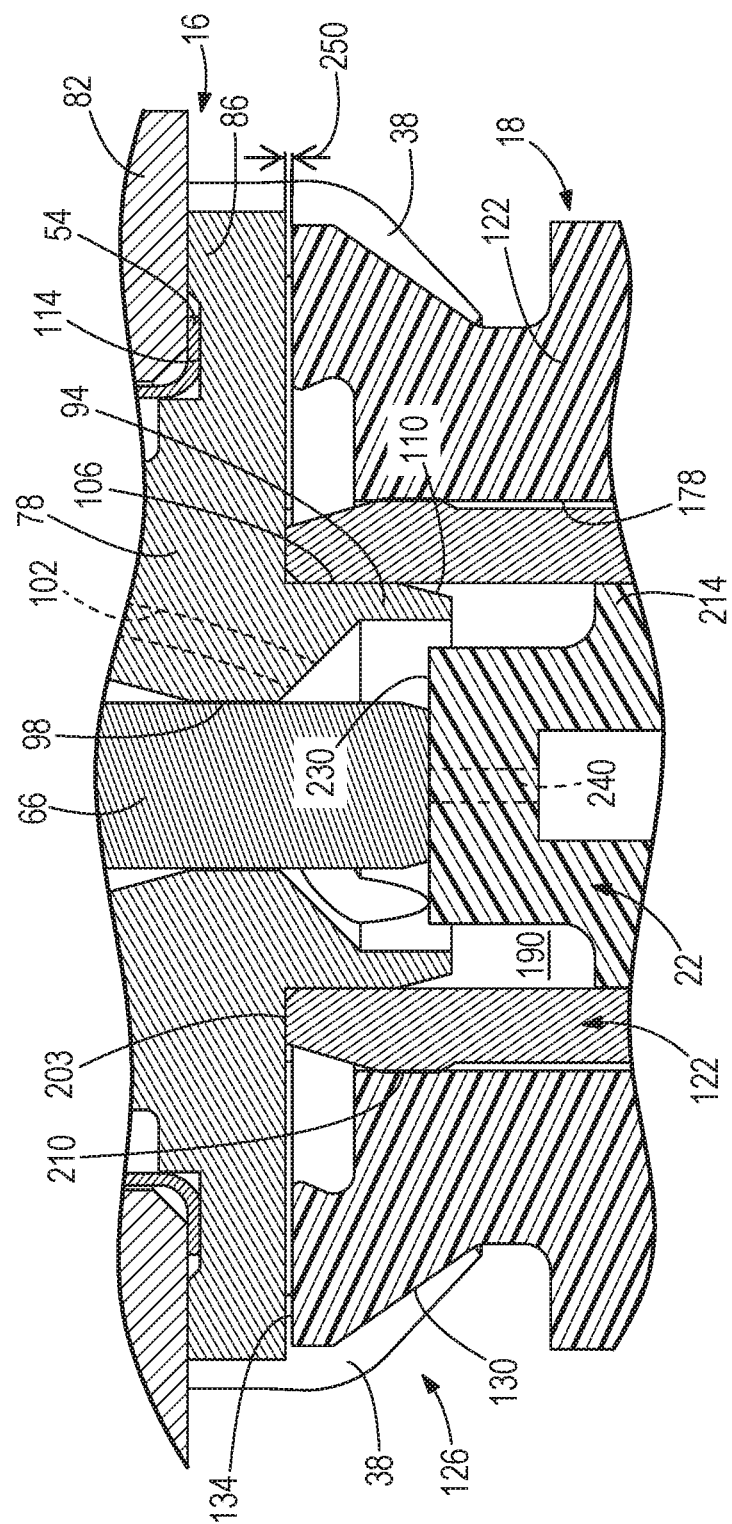
FIG. 5 is a detailed sectional view of the control valve of FIG. 1.

As shown in FIG. 5, the sleeve 122 defines a length that can be longer than a length of the inner bore 178 of the body housing 118 such that when the first end 203 of the sleeve 122 engages the coupling flange 86, a gap 250 can be created between the flange surface 134 of the body housing 118 and the coupling flange 86 of the pole piece 78. The gap 250 existing between the first end 203 of the sleeve 122 and the coupling flange 86 can enable the sleeve 122 to be maintained in compression between the pole piece 78 and the body housing 118. With the sleeve 122 maintained in compression, the second end 204 of the sleeve 122 can be biased into the bottom wall 174 of the body housing 118 thereby sealing off a leak path between the control ports 162, 198 and the tank port 182.

With the control valve 10 loosely assembled, the tabs 38 of the actuator housing 26 can be bent over the frustoconical surface 130 of the body housing 118 to secure the body housing 118 to the coupler 16 and compress the sleeve 122 between the coupler 16 and the body housing 118.

With the control valve 10 fully assembled, the seals 146, 158, 170 can be installed in their respective recesses 142, 154, 166 and the control valve 10 can be installed into the oil pump system. The above described order of assembly may be altered without changing the scope of the invention.

In operation, and in the absence of substantial pressure in the pump ports 150 and 194, the spring 246 can bias the spool 22 toward the first position (see FIG. 2A). In the first position, the spool 22 provides fluid communication between the control ports 162 and the tank port 182, and isolates the pump ports 150 therefrom. If the pressure in the pump ports 150, 194 increases substantially, the spool 22 can move toward the second position (see FIG. 2B), eventually connecting the pump ports 150, 194 to the control ports 162, 198 at a pressure pre-determined by the spring 246 design and the differential area of the two spool lands 214, 218.

When dictated by a control circuit (not shown), an electrical signal can be provided to the electrical connection 34 to energize the winding 42 and move the piston 62 and rod 66 toward the second position (see FIG. 2B). The magnetic force acting on piston 62 along with the pressure in the pump ports 150, 194 acting on the differential spool areas can cause the rod 66 to act against and move the spool 22 against the bias of the spring 246 and the tank port 182 pressure acting on the differential spool areas. In the second position, the spool 22 can be positioned such that the control ports 162, 198 are slightly open to both the pump ports 150, 194 and the tank port 182.

When dictated by the control circuit, another electrical signal can be provided to the electrical connection 34 to energize the winding 42 and move the piston 62 and rod 66 toward the third position (see FIG. 2C). In the third position, fluid communication can be provided between the control ports 162 and the pump ports 150 via the groove 222. When the electrical signal can be removed from the electrical connection 34, the bias of the spring 246 and the tank port 182 pressure acting on the spool differential area can move the spool 22 back toward the first position or where those forces balance with force from the pressure in the pump ports 150, 194 acting on the spool differential area.

The control valve 10 discussed above can be a proportional variable displacement oil pump control valve. In other embodiments, the control valve may be arranged as a cam phasing control valve. Additionally, aspects of the invention may be applied to other valve applications, as desired. The sleeve 122 can be constructed of aluminum that has been hard anodized to provide high wear resistance and contamination durability. In other embodiments, another metal may be used in place of aluminum. For example, stainless steel, ferrous alloys, bronze, or other metals may be employed. Additionally, aluminum that has not been hard anodized may be used.

The body housing 118 can be formed of an injection moldable material such as a plastic, a polymer, or a composite material allowing for complex geometry to be formed on the exterior of the body housing 118 (e.g., recesses 142, 154, 166 and geometry forming ports 150, 162, 182 as well as geometry designed to mate with filters and other external components) with improved consistency at a lower cost when compared to a body housing or valve body machined from solid metals. In one embodiment, the plastic can be Polyetherimide (PEI). In another embodiment, the plastic may be Polyethersulfone (PES), Polyphthalamide (PPA), Polysulfone (PSU), or Polyphenylene Sulfide (PPS). Additionally, other plastics, polymers, or composites may be used, as desired, to meet particular material needs for the desired application.

The critical tolerances for the spool timing and valve operation are formed in the sleeve 122 providing high quality and consistent performance. The press fit areas between the sleeve 122 and the body housing 118, namely the annular projections 206, 210, are arranged in a position spaced apart from the spool lands 214, 218 to inhibit spool 22 binding. In other words, the annular projections 206, 210 are positioned such that the lands 214, 218 do not overlap or come into contact with the inner valve bores 190, 186 adjacent to where the annular projections are located. This arrangement provides a more dependable and smooth operating valve.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

I claim:

1. A method of manufacturing a control valve, the control valve including a valve body having a plastic body housing defining an inner bore and a metallic sleeve defining a first annular projection and a second annular projection, a spool, a coupler in the form of a pole piece and having a sleeve projection, and an actuator, the method comprising:
    press fitting the metallic sleeve into the body housing such that the first annular projection and the second annular projection seal against the inner bore via a diameter of the first annular projection and the second annular projection being larger than the inner bore;
    inserting the spool into the metallic sleeve, wherein the spool includes a first land and a second land, and wherein the first annular projection and the second annular projection are positioned along the metallic sleeve such that the first land and the second land do not come into contact with inner valve bores adjacent to where the first annular projection and the second annular projection are located while the spool is positioned at any of a first position, a second position, and a position between the first position and the second position;
    inserting the sleeve projection into the metallic sleeve;
    coupling the pole piece to the sleeve, wherein an end of the spool is at least partially received in the sleeve projection in one of the first position and the second position, and wherein the sleeve projection includes an inner tapered portion that is arranged along an inner surface of the sleeve projection and configured to receive the end of the spool in the one of the first position and the second position; and
    coupling the actuator to the coupler and the valve body.

2. A control valve comprising:
    a valve body including a plastic body housing defining an inner bore and a metallic sleeve arranged within the inner bore of the body housing, wherein the metallic sleeve includes a first annular projection and a second annular projection each defining a diameter larger than the inner bore to form a press fit between each of the first annular projection and the second annular projection and the inner bore;
    a spool received within the metallic sleeve and movable between a first position and a second position, wherein the spool includes a first land and a second land, and wherein the first annular projection and the second annular projection are positioned along the metallic sleeve such that the first land and the second land do not come into contact with inner valve bores adjacent to where the first annular projection and the second annular projection are located while the spool is positioned at any of the first position, the second position, and a position between the first position and the second position;
    an actuator coupled to the valve body and coupled to the spool; and
    a pole piece arrange between the actuator and the valve body and including a sleeve projection within which an end of the spool is at least partially received in one of the first position and the second position, wherein the sleeve projection includes a outer tapered portion and an inner tapered portion, the outer tapered portion being arranged along an outer surface of the sleeve projection at an axial end of the sleeve projection, and the inner tapered portion being arranged along an inner surface of the sleeve projection and configured to receive the end of the spool in the one of the first position and the second position.

3. The control valve of claim 2, wherein the body housing includes a first housing port and a second housing port,
    wherein the metallic sleeve includes a first sleeve port in fluid communication with the first housing port and a second sleeve port in fluid communication with the second housing port, and
    wherein the spool inhibits fluid communication between the first sleeve port and the second sleeve port when in the first position, and provides communication between the first sleeve port and the second sleeve port when in the second position.

4. The control valve of claim 3, wherein the first annular projection is in a press fit engagement with the inner bore of the plastic body housing between the first housing port and the actuator, and the second annular projection is in a press fit engagement with the inner bore of the plastic body housing between the first housing port and the second housing port.

5. The control valve of claim 2, wherein the metallic sleeve defines a sleeve length, and
    wherein the inner bore defines a bore length that is less than the metallic sleeve length.

6. The control valve of claim 2, wherein the metallic sleeve is formed of a hard anodized aluminum.

7. The control valve of claim 2, wherein the metallic sleeve is formed of a ferrous metal.

8. The control valve of claim 2, wherein the sleeve projection is sized to be received within the metallic sleeve.

9. The control valve of claim 8, wherein the pole piece includes a coupling flange sealingly engaged with the metallic sleeve.

10. The control valve of claim 9, wherein a gap is defined between a flange surface of the plastic body housing and the coupling flange to maintain the metallic sleeve in compression between the pole piece and the plastic body housing.

11. A valve body for a control valve that includes an actuator configured to move a spool within the valve body, and a coupler arranged between the actuator and the valve body, the valve body comprising:

a plastic body housing defining an inner bore, a first housing port, and a second housing port; and a substantially cylindrical metallic sleeve press fit into the inner bore and configured to receive the spool, wherein the metallic sleeve defines a first sleeve port in fluid communication with the first housing port, and a second sleeve port in fluid communication with the second housing port, wherein the metallic sleeve includes a first annular projection and a second annular projection each defining a diameter larger than the inner bore to form a seal between each of the first annular projection and the second annular projection and the inner bore, wherein the spool includes a first land and a second land, and wherein the first annular projection and the second annular projection are positioned along the metallic sleeve such that the first land and the second land do not come into contact with inner valve bores adjacent to where the first annular projection and the second annular projection are located while the spool is positioned at any of the first position, the second position, and a position between the first position and the second position; and a pole piece coupled to the metallic sleeve and including a sleeve projection within which an end of the spool is at least partially received in one of the first position and the second position, wherein the sleeve projection includes an inner tapered portion that is arranged along an inner surface of the sleeve projection and configured to receive the end of the spool in the one of the first position and the second position.

12. The valve body of claim 11, wherein the metallic sleeve is formed of hard anodized aluminum.

13. The control valve of claim 11, wherein the metallic sleeve is formed of a ferrous metal.

14. The valve body of claim 11, wherein the seal against the inner bore formed by the first annular projection is arranged between the first housing port and the second housing port.

15. The valve body of claim 11, wherein the inner bore defines an inner bore length, and the metallic sleeve defines a sleeve length that is longer than the inner bore length.

* * * * *